APPARATUS FOR TIME-CORRECTING SEISMIC DATA
Filed Oct. 15, 1965
4 Sheets-Sheet 1
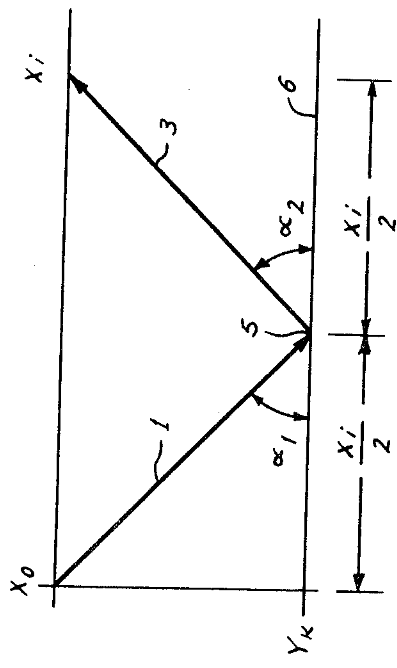
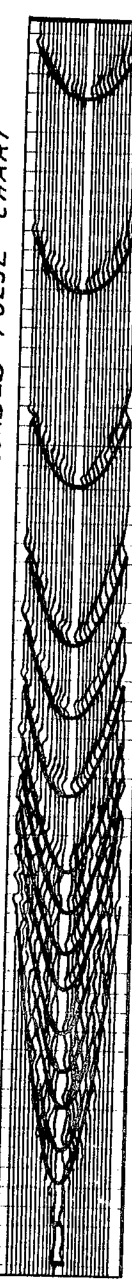
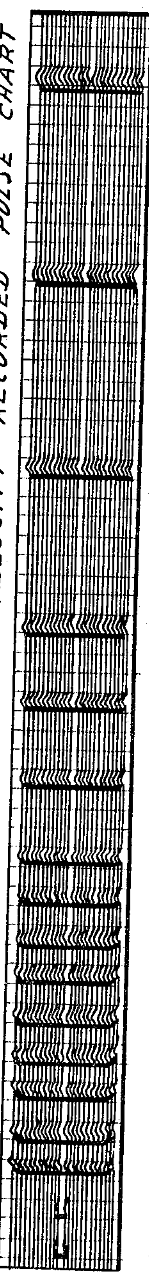
William W. Witt
Robert E. Williams
INVENTORS
BY
Arnold and Roylance
ATTORNEY William W. Witt
Robert E. Williams
INVENTORS

BY

Arnold and Roylance
ATTORNEYS

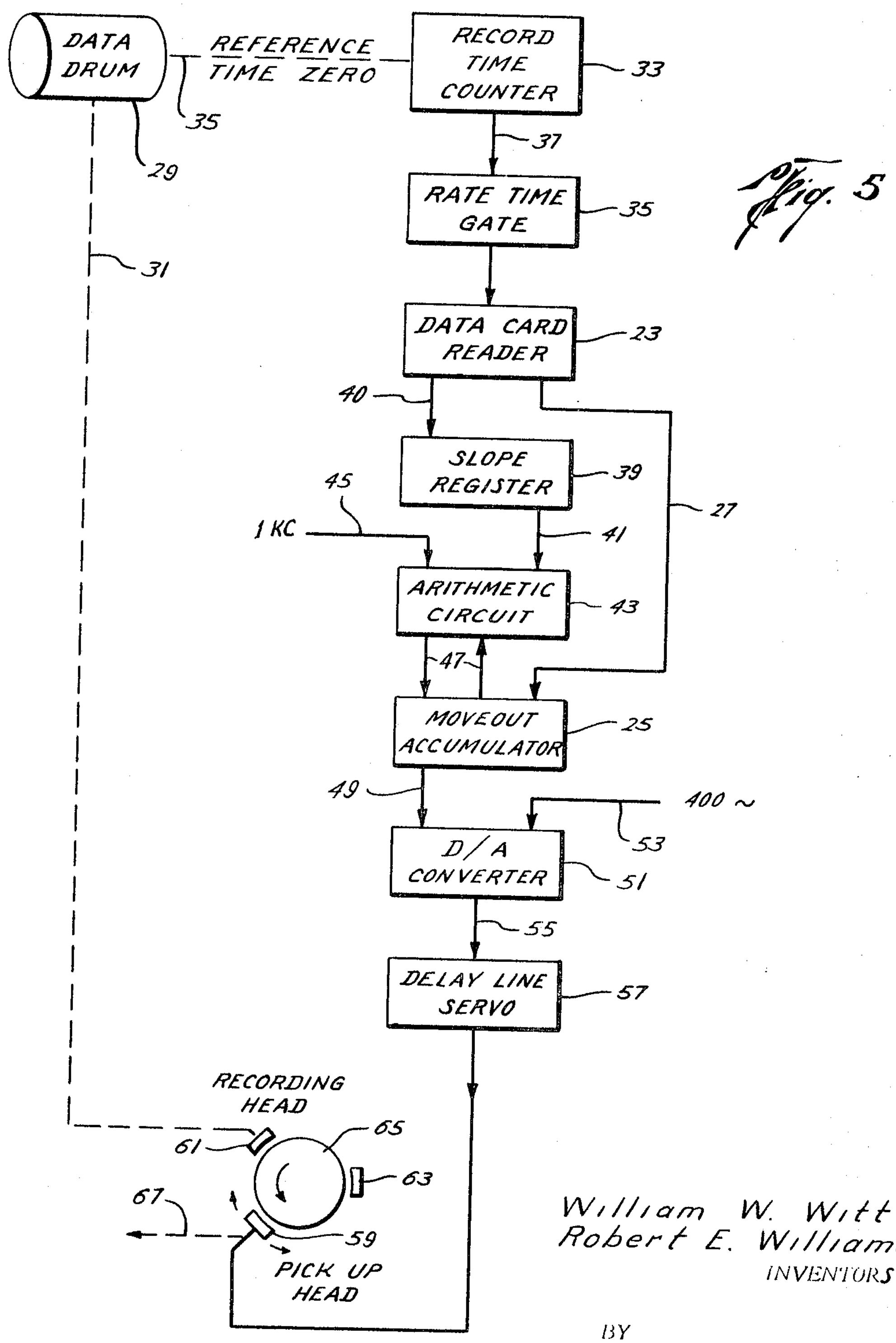
William W. Witt
Robert E. Williams
INVENTORS
BY
Arnold and Roylance
ATTORNEYS William W. Witt
Robert E. Williams
INVENTORS

BY

Arnold and Roylance
ATTORNEYS

United States Patent Office 3,348,194
Patented Oct. 17, 1967

3,348,194
APPARATUS FOR TIME-CORRECTING SEISMIC DATA

William W. Witt, Houston, and Robert E. Williams, Pearland, Tex., assignors to Geo Space Corporation, a division of Western Equities, Inc., Houston, Tex., a corporation of Nevada Filed Oct. 15, 1965, Ser. No. 496,365
3 Claims. (Cl. 340—15.5)

ABSTRACT OF THE DISCLOSURE

A method and apparatus for time-correcting seismic data are described, where seismic data is recorded on magnetic tape, and correction data is stored in digital form on punched cards. The required correction function is developed by subtracting increments from an initial amplitude value established in a register. The increments subtracted define the slope, or the time rate of change of the correction function from the initial value.

This invention relates to a function generator and more specifically to the generation of non-linear precision curves which may have application in correcting seismic data.

An irregularly shaped curve plotted with respect to rectangular Cartesian X and Y axes defines an area between the curve and the X axis. The X axis may be subdivided into incremental segments such that each segment has associated therewith an average amplitude. Therefore, it has been the practice to completely approximate a curve through the use of computer techniques by appropriately programming the sequence of the segments, the width of the segments and the average amplitude of the segments on data cards, data tape, etc.

For convenience of discussing the prior art function generators that use data of this type, it may be assumed that such a curve has been reduced to a suitable data program and is designated as the master curve. When it is known that a curve to be derived has generally the same shape as the master curve, but differing in amplitude, the master curve's programmed data may be used as a plotting base.

The amplitudes of the incremental segments of the master curve are typically represented by a voltage amplitude. At any instant of time the voltage amplitude of the master segment may then be impressed across a potentiometer having terminal connections representative of linearly proportional voltage settings of the voltage across the entire potentiometer. Such a potentiometer is known as a tapped potentiometer. For each curve segment if it is known by how much the derived curve (the one to be plotted) deviates from the master curve (for instance, it may be known that the amplitude for the first segment of the curve to be plotted is 90 percent of the amplitude for the master curve), the appropriate tap connection may be programmed to be selected (in this case, the tap corresponding to .9 of the total voltage amplitude). By following this procedure for each sequential incremental segment the complete derived curve may be plotted.

To plot a curve having segment amplitudes in excess of the amplitudes for segments of the master curve, voltage amplifiers may be used. For instance, a 1.5 voltage amplitude of the master curve may be arrived at by appropriate programming to select the .5 voltage tap and then by multiplying the resulting voltage by three.

Such an arrangement introduces two readily recognizable mechanical limitations to the derived or plotted curve. First, potentiometers commonly used are the wire-wound type, thereby introducing a limitation on the precision of voltage selection from one wire loop convolution of the potentiometer to the next. Second, and possibly more important, there are a finite number of taps that can be practically arranged along the perimeter of the potentiometer. Therefore, even if the programmed data is to the nearest one-hundredth of the amplitude value for the master curve, the actual resulting voltage approximation that can be mechanically selected may only be to the nearest one-thirtieth.

As has been stated, it is often common for the derived curve to be similiar in shape to the master curve. This similarity in shape means that the derived curve conforms to the contour of the master curve throughout its trace, or in other words, for every segment the slope of the derived curve will be essentially the same as the slope of the master curve, only differing in position or amplitude.

The plotting of a derived curve by taking a percentage of the voltage amplitude of the master curve to develop the amplitude of the derived curve is unduly complex for a derived curve that conforms in slope to the master curve. What should somehow program as a constant variation for each successive segment must program instead as a constantly changing value from segment to segment, and only after new percentage difference calculations are made for each slope deviation.

It may be easily seen that a constant percentage of the master curve is unsatisfactory through the use of examples. Assume values of two successive master curve segments amplitudes which are equal to 10 volts and 11 volts, respectively. Further, assuming unity segment spacing, the average slope of the master curve for these two segments is equal to 1. Assume also that it is known that the curve to be derived deviates from the master curve by one volt. This means that if the master curve has an average amplitude of 10 volts (calculated from the total number of segments making up the curve) the derived curve may be approximately developed by taking .9 of the amplitude for each segment. The two successive amplitudes of the derived curve corresponding to the two segments of the master curve will be respectively .9 times 10 (or 9 volts) and .9 times 11 (or 9.9 volts). This establishes a slope of .9, which is 10 percent in error from the actual slope of 1 for the master curve.

Other examples for segments having amplitudes further removed from the average or for two successive segments having a larger slope than the one assumed show that by such a curve deriving technique, for many purposes unacceptable deviations from the true derived curve will occur. The error is the most pronounced for curves which deviate materially from the horizontal or X axis. It should be further noted that when a constant proportion of the amplitude of a master curve is used in deriving another curve therefrom the result is a corresponding proportioning of the slope of the derived curve. Hence, the technique described introduces error both in amplitude and slope of the derived curve.

From the foregoing it may be seen that to determine the derived curve accurately it is actually necessary to know for each point along the X axis, not only by what amount the derived curve differs from the master curve, but by what percentage this particular difference is of the master value. In effect, the absolute amplitude value for each point along the curve where the slope materially changes must be known. Hence, in effect, there is no need for the master curve at all, plotting amplitude deviations of the segments from the X axis being just as convenient as plotting deviations from a master curve.

The method that is described herein eliminates the need for reliance upon a master curve and any inaccuracies that may be therein and avoids the use of a tapped potentiometer and the limitations introduced thereby.

Rather than plotting a curve based on amplitude point-to-point values from a master curve or based solely on amplitude values at all, the method described herein begins with only a single initial amplitude value. Points along the curve are predetermined where the slope materially changes. In addition, the average slope rates themselves between points are also determined.

By plotting successively constant slope rates equal to the successively determined average slope rates between the points, starting at the beginning amplitude value of the curve as the initial point, a straight line approximation of the curve is accurately plotted. The number of points selected determines how accurately the straight line trace conforms to a gradually changing continuous curve.

The chief advantage of such a method over prior art methods is that the inventive method described herein lends itself readily to conventional computer techniques wherein resolution, versatility and accuracy are all improved. Also, as will be shown, the need for using a tapped potentiometer or other electromechanical components is eliminated so that all components may be purely electronic in nature.

Therefore, the method that is described herein is generally the method of plotting a variable amplitude curve in which the amplitude is plotted with respect to one Cartesian coordinate and time is plotted with respect to another Cartesian coordinate, which comprises establishing an initial amplitude value of the curve at zero time condition, establishing an initial slope rate of the curve at zero time condition, changing the amplitude of the curve at said initial slope rate with successive substantially equal incremental time conditions, successively establishing new slope rates of the curve at predetermined segmental time conditions, each of said segmental time conditions being a multiple of said incremental time condition, and changing the amplitude of the curve at each of said new slope rates during its establishment for substantially equal incremental time conditions, thereby defining a straight-line approximation of a variable amplitude curve.

Some specific unique apparatuses, individually and in combination, for accomplishing the method generally outlined above are also described herein. Although there are a wide number of anticipated uses or applications for the function generator described herein, the invention may be explained in its application with respect to correcting seismic data.

In seismic exploration it is common to initiate a shock wave at a point on the ground or surface level referred to as the shot point and to receive reflected transmission from subsurface stratum layers at multiple receive stations at ground level but displaced from the shot point, sometimes by quite large distances. Geophones are the devices normally used for receiving these reflected waves. The features of the invention which are believed to be novel are set forth with particularity in the appended claims. The invention itself, however, both as to its organization and mode of operation, together with further objects and advantages thereof, may best be understood by reference to the following description taken in conjunction with the accompanying drawings in which the same numerals refer to like parts and in which:

FIG. 1, shows in diagrammatic form the effect of distance on the information received by a remote receive station;

FIG. 3, shows a group of uncorrected pulse seismic charts;

FIG. 4, shows a group of corrected pulse seismic charts;

FIG. 5, shows in block-diagram form a system for time-correcting seismic data where seismic data is recorded on magnetic tape and correction data is stored on digital punched cards.

In FIG. 1, the shot point is located at $X_o$, the receive station is located at $X_i$ and the reflecting stratum layer is located at a distance $Y_k$ beneath the surface. The wave from the shot point to the receive station via the reflecting layer is indicated by lines 1 and 3, the reflecting point on the reflecting layer being at point 5.

Assuming an average velocity of the wave through the ground medium through which the wave travels of $V_a$ and ideal planar, straight-line conditions otherwise, the angle of incidence $\alpha_1$ that line 1 makes with reflecting layer 6 is equal to the angle of reflection $\alpha_2$ that line 2 makes with the reflecting layer. Also, line 1 is equal in length to line 3, which may be figured trigonometrically to be $$\sqrt{Y^2+\left(\frac{X_i}{2}\right)^2}$$

If a receiving geophone were to be placed at $X_o$, the reflected wave would arrive at $$t_o=\frac{2Y_k}{V_a}$$

For a receiving geophone placed at $X_i$, the arrival time will be $$\frac{2\sqrt{Y_k{}^2+\left(\frac{X_i}{2}\right)^2}}{V_a}$$

or by rearranging, $$t_i=\sqrt{\left(\frac{2Y_k}{V_a}\right)^2+\left(\frac{2X_i}{2V_a}\right)^2}$$

Hence, by substituting $t_o$ in the equation, $$t_i=\sqrt{(t_o)^2+\left(\frac{X_i}{V_a}\right)^2}$$

$\Delta t_i$ may be defined at $(t_i-t_o)$, the graph of which when plotted against $t_o$ for a given $X_i$ being conveniently referred to as the $\Delta t_i$ curve. The equation for $\Delta t_i$ is as follows:

$$\Delta t_i=-t_o+\sqrt{(t_o)^2+\left(\frac{X_i}{V_a}\right)^2}$$

Figure 2:
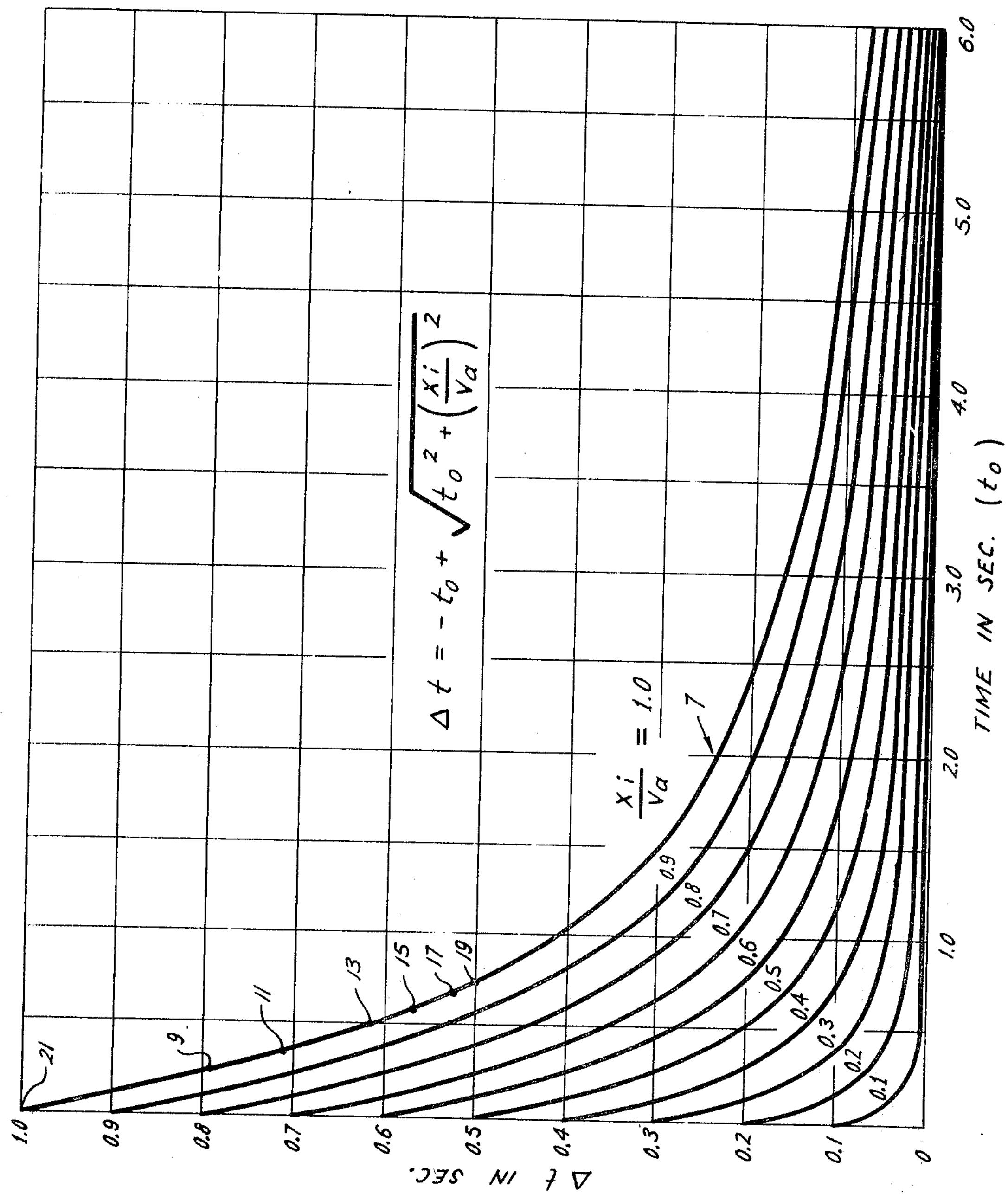
FIG. 2, shows a number of Δ+ curves for difference $X_i/V_a$ ratios.

Several $\Delta t$ curves for a number of $X_i/V_a$ ratios are shown in FIG. 2.

The importance of plotting such curves may be shown by considering the reflected data received. Data received at $X_o$ is received in the minimum amount of time such that no time correction is necessary to accurately determine the depth of the reflecting layer. However, data received at $X_i$ is received at $\Delta t_i$ time later. If $\Delta t_i$ is subtracted from $t_i$, then the plotted seismic data for geophones located at $X_o$ and $X_i$ may be interpreted with reference to the same base time.

A group of uncorrected recorded pulse seismic charts are shown in FIG. 3 and a group of corrected pulse seismic charts are shown in FIG. 4. It may be noticed that for reflecting layers near the surface the $\Delta t$ phenomenon is very acute, and for layers at greater depths the correction becomes less important. This is readily apparent since at great depths the distance straight down from the shot point and back again is only slightly shorter than the distance down and back to a geophone not at the shot point, the lateral distance being relatively small with respect to the vertical distance. This is not true for shallow reflecting depths, hence the large $\Delta t$ values near zero time in FIG. 2.

In order to develop a set of curves similar to those shown in FIG. 2, the average velocity for the particular ground medium being surveyed must be determined. After this is done, for various geophone receiving station locations ($X_i$'s) the curves may be plotted.

Once a curve is plotted, it must then be translated into data handling information useful in correcting the received seismic data. In the following discussion, the $$\frac{X_i}{V_a}=1.0$$

curve, designated as curve 7 in FIG. 2, will be considered.

In accordance with the present invention, it is first necessary to determine points along curve 7 where the slope changes materially. A few of these points, designated as points 9, 11, 13, 15, 17 and 19, are shown. Notice that the points are selected at convenient subdivisions of the time scale. For instance, point 9 is selected at the 0.25-second position, point 11 is selected at the 0.35-second position, point 13 is selected at the 0.5-second position, and so forth.

In addition, the slope of the curve from zero time point 21 and point 9 and the slopes between each of the successive points along the curve are also determined. Finally, the amplitude value at zero time ($\Delta t_0$) for point 21 is determined.

The initial amplitude value, the value of $\Delta t_0$, may be placed on a data card. The slope values may then be placed on the same card in consecutive columns.

FIG. 5 shows a block diagram for using the data card for the curve and correcting the seismic data received from a geophone placed at position $X_i$ for which the curve is calculated.

The data card reader 23 of any conventional configuration compatible with the data card being used interrogates the initial amplitude column on the data card and inserts the information in moveout accumulator 25 via line 27. Moveout accumulator 25 may conveniently take the form of the usual scaler or counter comprised of conventional flip-flop circuits. The amplitude may be set into accumulator 25 as a count prior to the zero time condition or may be set in simultaneously with the initial slope condition at zero time condition (the initial slope setting being discussed below).

Data drum 29 on which the seismic information for the station or channel under consideration is recorded also has recorded thereon an indication for zero time condition (the start point for the transmission shot). Simultaneously, with the transmission of the recorded seismic data on drum 29 along line 31, the reference time zero pulse is transmitted from drum 29 to record time counter 33 along line 35. Record time counter 33 may conveniently take the form of a precision clock controlled by a tuning fork oscillator to keep track of time at least to the nearest millisecond.

At zero time there is a pulse initiated from record time gate 33 through rate time gate 35 via line 37. Rate time gate 35 may conveniently take the form of a diode matrix. When a diode matrix is used as the rate time gate 35, line 37 may take the form of multiple connections from the clock to the various base lines in the matrix. A different sequence of these connections is conditioned for each millisecond counted by counter 33 so that an output from the matrix is produced dependent on the time in the counter and the wiring of the diodes in the matrix. At zero time, rate time gate 35 is conditioned so that data card reader 23 inserts the initial slope condition from the first slope information column into slope register 39 via line 40.

Output 41 of slope register 39 is connected to arithmetic circuit 43, comprising adder or subtractor circuits, which also has applied thereto an external 1-kc. pulse or square wave input 45 derived from any convenient source (not shown). This means that there is a signal input 45 applied to arithmetic circuit 43 every millisecond.

The output of arithmetic circuit 43 is connected to moveout accumulator 25 via line 47. At every occurrence of input 45, the arithmetic circuit 43 causes the count in slope register 39 to be added to or to be subtracted from the count in moveout accumulator 25. Whether or not the slope is positive or negative (i.e., whether or not the slope register count is to be added or subtracted from the count in moveout accumulator 25) may be recorded as sign information in a column in the data card with the slope rate information.

Arithmetic circuit 43 may comprise logic circuits for steering pulses to allow proper borrowing and carrying of numbers from one digit to the next during the operating sequence, the specific configuration of an operable circuit being obvious to one skilled in the art. Suitable adder circuits are shown on pages 84 and 85 and suitable subtractor circuits are shown on pages 116 and 117 of Arithmetic Operations in Digital Computers by R. K. Richards, published 1955 by D. Van Nostrand Company, Inc.

Output 37 from record time counter 33 may be only one of many outputs from counter 33 to record time gate 35. For each millisecond of time, a different combination of outputs then may be applied to rate time gate 35.

After a predetermined number of milliseconds established by the wiring of the diode matrix of rate time gate 35 to select points 9 through 19 on curve 7 shown in FIG. 2 (for example for point 9, after 250 milliseconds), the rate time gate passes a signal to condition data card reader 23 to interrogate the second slope rate information column on the data card.

The output from data card reader 23 then inserts a new number in slope register 39 representative of the new slope. Therefore, until a new number is impressed by a similar process into slope register 39, every signal 45 will cause the count in moveout accumulator 25 to change by the newly established slope amount.

By sequentially repeating the process described above, the output from moveout accumulator 25 accurately digitally represents a straight-line approximation of curve 7 throughout the entire interval. How closely the straight-line approximation conforms to the actual gradual continuous curve depends on how many points along the line are selected at which new slope information is placed on the curve.

The output 49 from moveout accumulator 25 may then be applied to a digital-to-analog converter 51, which may be typically a voltage divider network wherein one side of the divider is a fixed resistor and the other side comprises a group of graduated precision resistors and electronic switches selectable in accordance with the digital count in the moveout accumulator. When a fixed reference voltage is impressed across both sides of the divider, the junction point between the fixed resistor and the graduated resistors may be used as a convenient point for taking an accurate analog voltage.

Digital-to-analog converter 51 may also include a chopper circuit (not shown) for converting the analog voltage to alternating current voltage. Such a chopper may be driven by a fixed alternating current signal, such as 400 c.p.s. signal 53. Output 55 from converter 51 may then be used to drive delay line servo 57, which, in turn, positions pick up head 59, as will be explained below.

The value of output 55, which is really the amount of $\Delta t$ correction, is coordinated in time with the data information to which it is applied as a correcting factor by reference time zero signal 35, explained above.

An arrangement that may be used for correcting the data from data drum 29 in accordance with the output from delay line servo 57 comprises a recording head 61, a pick up head 59, an erase head 63 and a rotatable recording medium 65, such as a drum or a magnetic tape or band wrapped around a drum.

When such an arrangement is used, medium 65 is set into substantially constant rotation by suitable drive means (not shown). In FIG. 5, this motion is shown to be counterclockwise. Recording head 61, fixedly disposed opposite the recording surface of medium 65, receives the uncorrected seismic data signal 31 and impresses medium 65 therewith. Pick up head 59, positionally movably disposed opposite medium 65 detects the signal impressed on medium 65 by head 61 at a time later as determined by the speed of rotation of medium 65 and the position of head 59.

The position of head 59 with respect to head 61 along the periphery of medium 65 is determined by conventional servo operation of delay line servo 57 as driven by $\Delta t$ signal 55. Therefore, by this re-recording and corrected pick up method of detection the $\Delta t$ correction is applied directly to the seismic data originally recorded on drum 29, the eventual output being taken from head 59 as output 67.

Disposed along the periphery of medium 65 between pick up head 59 and recording head 61 is an erasing head 63, in the illustration shown as being in a counterclockwise direction from the pick up head. Head 63 erases or clears the medium of signals impressed thereon by recording head 61 after the signals on the medium have been detected by pick up head 59 and before that portion of medium 59 again passes opposite head 61.

When medium 65 is a drum, the longitudinal axis of which is perpendicular to the paper and heads 59 and 61 being mounted to track parallel with such axis from revolution to revolution of the drum, which may be accomplished through a lead-screw arrangement, no erase head is required. This is because no portion of medium 65 repeats under the recording head until the complete drum is tracked. After such tracking, then the whole drum may be erased prior to retracking.

If desired, it is possible to include a final amplitude value on the data card as a check. If the amplitude arrived at through changing slope values from an initial amplitude value according to the method described above should deviate from the final known amplitude value by an error amount, a warning signal is given.

Also, muting signals or clearing signals may be used to reset all registers and accumulators prior to and immediately following a complete sequence of operation with respect to a set of curved line data.

Figure 6:
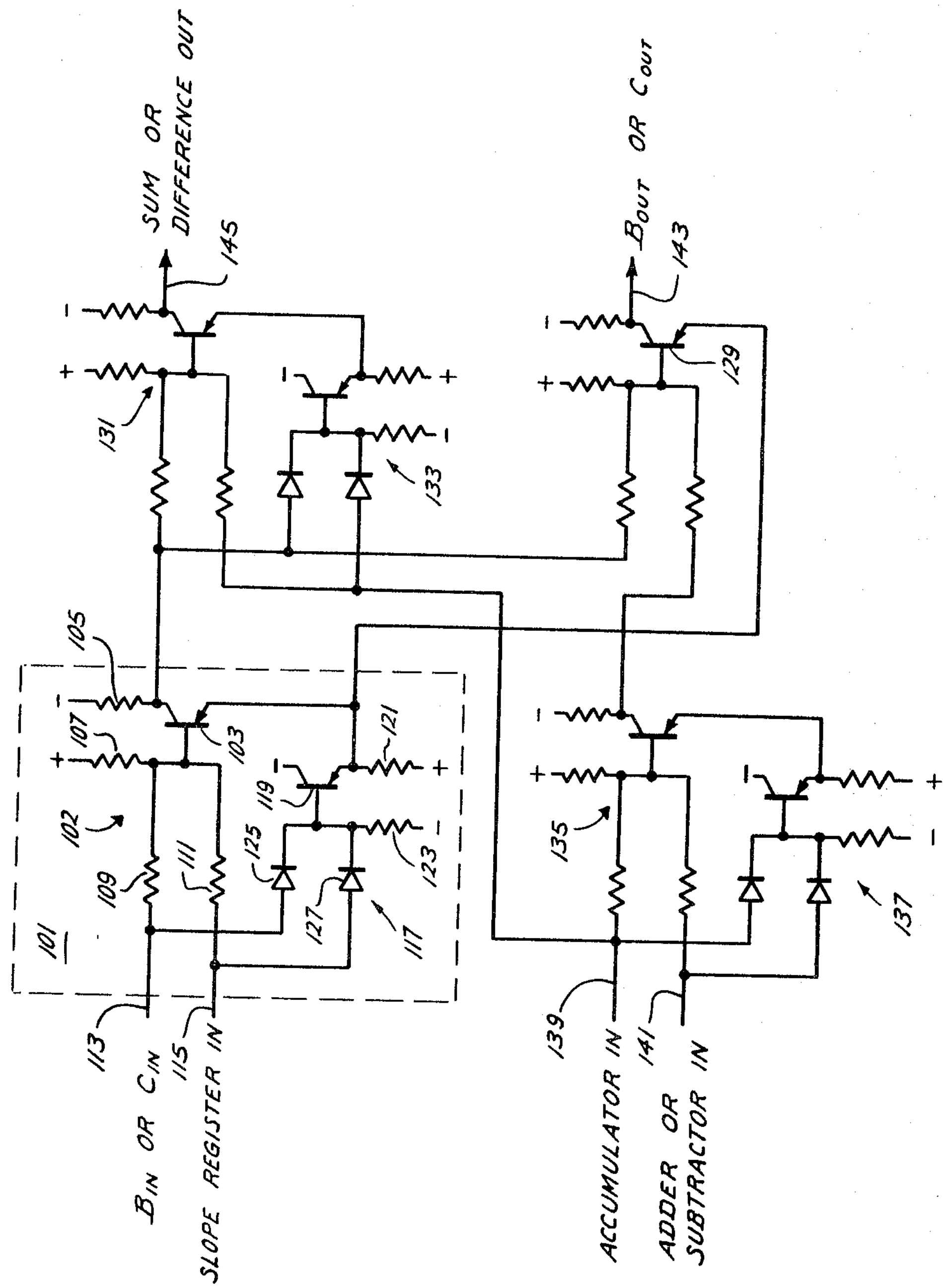
FIG. 6 shows a preferred circuit diagram of the arithmetic circuit shown in block form in FIG. 5.

A unique circuit which may be used and is particularly well adapted as an arithmetic adder or subtractor stage is shown in FIG. 6, it being possible to have a number of such stages. There are four inputs to this circuit and two outputs. Two of the inputs are connected to the two binary component connection points at which the binary numbers to be added or subtracted are present (for instance, the output of the slope register and the output of the accumulator), one is a carry or borrow input connection from the next lower order arithmetic stage, and the last is an add or subtract sign, which may be a direct connection from a circuit which interrogates a column on the data card. The two outputs are respectively a borrow or carry output connection and a sum or difference connection (depending on the operating condition of the circuit, viz., adding or subtracting).

The operation of the circuit may be best explained by first referring to one set of gates blocked off in the diagram with dotted lines and indicated as gates 101. Essentially, gates 101 comprise an OR gate 102 and an AND gate 117, the operation of which may be explained separately, although, as will be seen, there are some interconnections between the circuits.

OR gate 102 comprises pnp transistor 103, collector bias resistor 105, base bias resistor 107, emitter bias resistor 121, and input resistors 109 and 111 connected to the base of transistor 103. Negative logic is assumed wherein (—) is associated with logic numeral 1 and ground is associated with logic zero or numeral 0.

Transistor 103 may be a type 1305 transistor, resistor 105 may be a 2.2K-ohm resistor connected to a negative bias, resistor 107 may be a 27K-ohm resistor connected to a positive bias, and input resistors 109 and 111 may be 10K-ohm resistors. Also, the emitter of transistor 103 is positively biased across resistor 121, the value of which will be explained later.

When input 113 connected to resistor 109 and input 115 connected to resistor 111 are both at ground potential (logic 0), a positive potential is applied to the base of transistor 103, thereby keeping it in a non-conducting state. However, when either input 113 or 115 becomes a logic 1 (—), then the voltage division by resistors 107, 109, and 111 is such that there is a negative potential placed across the emitter-base diode of transistor 103, causing it to conduct.

Furthermore, when either input 113 or 115 is at ground potential, through the operation of diodes 125 and 127 and transistor 119, as will be explained below, the emitter of transistor 103 is held at ground potential. However, when both inputs are at logic 1 (—), then the emitter of transistor 103 through transistor 119, also becomes logic 1 or (—), changing the requirements of the potential needed to be applied to its base for conduction. Hence, transistor 103 cuts off, restoring the output on the collector of transistor 103 to (—).

To summarize the operation, when both inputs are at logic 0, the output from the collector of transistor 103 is at logic 1; when either input is at logic 1, the output of transistor 103 is at logic 0; and when both inputs are at logic 1, the output of transistor 103 is at logic 1. Therefore, transistor 103 is an effective exclusive OR circuit plus an inverter.

Since resistor 121 is also the emitter bias resistor of transistor 129 (which will be described later) it must supply current to both transistors 103 and 129. When transistor 103 conducts, the voltage dividing action caused by the negative bias on resistor 105, the slight drop across the emitter-collector diode of transistor 103, and the drop across resistor 121 to its positive bias, must be such that the emitter of transistor 103 becomes logic 0, or ground. Assuming that the positive and negative biases are of equal potential from ground and because of the small drop in the transistor, a resistance value for resistor 121 of slightly half of the value for resistor 105 should be chosen. A satisfactory value for resistor 121 is 1K ohm.

Consider now AND circuit 117, which comprises pnp transistor 119, emitter bias resistor 121, base bias resistor 123, and diodes 125 and 127 connected respectively to inputs 113 and 115 such that their anodes are connected to the inputs and their cathodes are connected to the base of transistor 119.

Transistor 119 may be a type 1305 transistor, resistor 123 may be a 10K-ohm resistor connected to a negative bias, and diodes 125 and 127 may be type 1N34. Also, the collector of transistor 119 is tied directly to a negative bias.

In operation of transistor 119, it should first be noted that regardless of the two possible logic inputs applied, the transistor will always be in a conducting state. This is merely because either ground potential or negative potential is sufficient to forward bias the base-emitter diode of the transistor for conduction.

When inputs 113 and 115 are both at ground potential, diodes 125 and 127 are both biased to conduction, supplying the base of transistor 119 with ground potential, and hence the emitter with ground potential. Similarly, when only one of the inputs are at ground potential there will still be ground potential applied to the base of transistor 119. Actually, it should be noted that there is a slight drop across the conducting diode (in a direction plus-to-minus from the input) and a slight drop across the base-emitter diode in the transistor (in a direction minus-to-plus from the input). But, if the diode material and the transistor material are both the same (for instance, both germanium or both silicon) then these drops will cancel one another and ground will be accurately reflected on the emitter. Also, notice that since the emitter is used for the output, there is no phase reversal from input of the transistor to the output.

When both inputs 113 and 115 are at logic 1 (—) potential, then both diodes cut off and the base of transistor is placed at the bias value of resistor 123. This value is reflected through transistor 119 as logic 1 in the output taken from the emitter.

Therefore, it should be apparent that transistor 119 and its associated circuit functions as a pure AND circuit, there being no phase reversal action.

A workable overall circuit may be made by using the same component values and types for the respective parts for the remainder of the gates shown. The one exception is the value for the resistors corresponding to resistor 121. Since there is no double current drain in their operation, a value of 2K-ohms may be used. It should also be recognized that the gate in the lower right portion of the diagram comprising transistor 129 and its associated components is only an exclusive OR-inverter gate without an associated AND gate.

It should be noted that there is one peculiar connection made to transistor 129 that modifies its operation, when compared to the operation of the other OR-type gates. This is the connection of the emitter of transistor 119 to the emitter of transistor 129. At any time the emitter of transistor 129 is made negative, regardless of the state of the inputs, the transistor cuts off and there is a logic 1 (—) output.

When the emitter of transistor 129 is logic 0 (ground), if either or both of the inputs to the base are logic 1 (—), the transistor conducts, causing the output to be ground. Since the emitter bias is not controlled through an AND gate by the same inputs as to the OR gate (as with transistor 103) there is no exclusiveness of OR function. Hence, transistor 129 acts as an OR-inverter gate with respect to its base inputs and an OR gate only with respect to its emitter signal.

The connections shown in FIG. 6 are such that the exclusive OR-inverter gate 102 is connected to one input of a similar gate 131, to the associated AND gate 133, and as a base input to transistor 129. The output from another exclusive OR-inverter gate 135 and AND gate 137 combination, controlled by inputs 139 and 141, is applied to the other base input to transistor 129. As previously noted, the emitter input to transistor 129 is taken from the output of AND gate 117. Finally, one of the inputs to gates 135 and 137, namely, input 139, is applied as the second input to gates 131 and 133. The two outputs from the circuit are taken from transistor 129 and gate 131 at outputs 143 and 145, respectively.

Typically, input 113 may be the borrow or carry connection from the previous stage of the arithmetic circuit (or in the case of the first stage, the connection is tied to ground), input 115 may be the output from the slope register, input 139 may be the output from the accumulator, and input 141 may be the sign function (which may be hard-wired to logic 1 (—) if the slope of the curve being reproduced is known always to be in a progressively negative direction). Output 143 may be the borrow or carry out signal to the input 113 in the subsequent stage of the arithmetic circuit (this output not being connected in the case of the last stage thereof) and output 145 may be the sum or difference pulse to the input of the accumulator.

| X | Y | $B_{in}$ or $C_{in}$ | S or D | $C_{out}$ | $B_{out}$ |
|---|---|---|---|---|---|
| 0 | 0 | 0 | 0 | 0 | 0 |
| 0 | 0 | 1 | 1 | 0 | 1 |
| 0 | 1 | 0 | 1 | 0 | 1 |
| 0 | 1 | 1 | 0 | 1 | 1 |
| 1 | 0 | 0 | 1 | 0 | 0 |
| 1 | 0 | 1 | 0 | 1 | 0 |
| 1 | 1 | 0 | 0 | 1 | 0 |
| 1 | 1 | 1 | 1 | 1 | 1 |

Hence, it may be seen that the circuit is a full adder or subtractor circuit which may be represented by the above truth table.

While various embodiments of the invention have been described, it is obvious that substitutes or modifications of structure may be made without varying from the scope of the invention.

What is claimed is:

1. Apparatus for correcting recorded traces in accordance with curved line information stored in digital data form such that the initial amplitude value thereof is stored and slope values are stored for predetermined sequential segmental time conditions, comprising data means on which a recorded trace appears, said means producing a pulse at the beginning of the trace, a record time counter connected to said data means for receiving said beginning pulse and producing timing signals at successive substantially equal incremental times, rate time gate means triggered by the timing signals from said record time counter, digital data reader means for initially interrogating the stored curved line information for the initial amplitude value and for the initial slope value thereof, said rate time gate means producing signals to said digital data reader means at the beginning pulse and at the predetermined sequential segmental times, said segmental times being integer multiples of said incremental times, accumulator means connected to said data reader means for initially storing the initial amplitude value of the stored curved line information, slope register means connected to said data reader means for initially storing the initial slope value of the stored curved line information, said rate time gate means causing said data reader to change the clope value in the slope register means in accordance with the stored slope value at the predetermined sequential segmental time conditions, arithmetic means triggered by said slope register at incremental times for changing the stored amplitude value in the accumulator by the slope value in the slope register means, A digital-to-analog converter coupled to said accumulator means for converting the output from said accumulator means to analog form, servo drive means driven at a rate proportional to the value in said accumulator, a constantly moving recording medium, recording means receiving the recorded traces from said data means and recording said traces on said constantly moving recording medium, and pickup means for detecting the traces from said recording medium as positioned by said servo drive means so that the output produced is the recorded traces corrected by the stored curved line information.

2. Apparatus for correcting recorded traces in accordance with curved line information stored in digital data form such that the initial amplitude value thereof is stored and slope values are stored for predetermined sequential segmental time conditions, comprising data means on which a recorded trace appears, said means producing a pulse at the beginning of the trace, a record time counter connected to said data means for receiving said beginning pulse and producing timing signals at successive substantially equal incremental times, rate time gate means triggered by the timing signals from said record time counter, digital data reader means for initially interrogating the stored curved line information for the initial amplitude value and for the initial slope value thereof, said rate time gate means producing signals to said digital data reader means at the beginning pulse and at the predetermined sequential segmental times, said segmental times being integer multiples of said incremental times, accumulator means connected to said data reader means for initially storing the initial amplitude value of the stored curved line information, slope register means connected to said data reader means for initially storing the initial slope value of the stored curved line information, said rate time gate means causing said data reader to change the slope value in the slope register means in accordance with the stored slope value at the predetermined sequential segmental time conditions, arithmetic means triggered by said slope register at incremental times for changing the stored amplitude value in the accumulator by the slope value in the slope register means, a digital-to-analog converter for converting the output from said accumulator means to analog form, servo drive means driven at a rate proportional to the value in said accumulator, a constantly moving recording medium, recording means receiving the recorded traces from said data means and recording said traces on said constantly moving recording medium, pickup means for detecting the traces from said recording medium as positioned by said servo drive means so that the output produced is the recorded traces corrected by the stored curved line information, and said arithmetic means comprising a first exclusive OR inverter gate for receiving the output from said slope register, and a second exclusive OR inverter gate for receiving the output from said first exclusive OR inverter gate and the output from the accumulator, the output thereof being applied as an input to the accumulator.

3. Apparatus for correcting recorded traces in accordance with curved line information stored in digital data form such that the initial amplitude value thereof is stored and slope values are stored for predetermined sequential segmental time conditions, comprising data means on which a recorded trace appears, said means producing a pulse at the beginning of the trace, a record time counter suitably connected to said data means for receiving said beginning pulse and producing timing signals at successive substantially equal incremental times, rate time gate means triggered by the timing signals from said record time counter, ditigal data reader means for initially interrogating the stored curved line information for the initial amplitude value and for the initial slope value thereof, said rate time gate means producing signals to said digital data reader means at the beginning pulse and at the predetermined sequential segmental times, said segmental times being integer multiples of said incremental times, accumulator means connected to said data reader means for initially storing the initial amplitude value of the stored curved line information, slope register means connected to said data reader means for initially storing the initial slope value of the stored curved line information, said rate time gate means causing said data reader to change the slope value in the slope register means in accordance with the stored slope value at the predetermined sequential segmental time conditions, arithmetic means triggered by said slope register at incremental times for changing the stored amplitude value in the accumulator by the slope value in the slope register means, a digital-to-analog converter for converting the output from said accumulator means to analog form, servo drive means driven at a rate proportional to the value in said accumulator, a constantly moving recording medium, recording means receiving the recorded traces from said data means and recording said traces on said constantly moving recording medium, pickup means for detecting the traces from said recording medium as positioned by said servo drive means so that the output produced is the recorded traces corrected by the stored curved line information, and said arithmetic means being a repetitive multistage circuit, each stage of which comprises a first exclusive OR inverter gate and an AND gate, each connected for receiving the output from said slope register means and, for each stage after the first one, a borrow or carry in signal from the preceding stage, a second exclusive OR inverter gate, for the first stage of which, connected for receiving the output from said accumulator means and an adder or subtractor direction change input, and for subsequent stages, each connected for receiving the sum or difference out of the preceding stage and the adder or subtractor direction change input, a third exclusive OR inverter gate connected for receiving the output from said first OR inverter gate and, for the first stage of which, the output from said accumulator means, and for subsequent stages, the sum or difference out of the preceding stage, and for each of the stages except the last stage, an OR gate connected for receiving and inverting the outputs from said first and third exclusive OR inverter gates and for receiving the output from said AND gate and producing an output therefrom as a borrow out or carry out to the next subsequent stage.

References Cited

UNITED STATES PATENTS

| | | | |
|---|---|---|---|
| 2,879,860 | 3/1959 | Tilley | 340—15.5 |
| 2,994,851 | 8/1961 | Bucy et al. | 340—15.5 |
| 3,075,172 | 1/1963 | Loper et al. | 340—15.5 |
| 3,092,805 | 6/1963 | Koeijmans | 340—15.5 |
| 3,156,892 | 11/1964 | Woods et al. | 340—15.5 |

OTHER REFERENCES

Skerritt: IBM Technical Disclosure Bulletin, vol. 1. No. 2, August 1958, p. 43.

BENJAMIN A. BORCHELT, *Primary Examiner.*

R. M. SKOLNIK, *Assistant Examiner.*